United States Patent
Song et al.

(10) Patent No.: US 10,788,072 B1
(45) Date of Patent: Sep. 29, 2020

(54) HINGE BUSH FOR VEHICLE PEDAL APPARATUS

(71) Applicants: Hyundai Motor Company, Seoul (KR); Kia Motors Corporation, Seoul (KR); DONG HEE INDUSTRIAL CO., LTD., Ulsan (KR)

(72) Inventors: Ki Young Song, Suwon-Si (KR); Han Gil Park, Suwon-Si (KR); Sung Hoon Lee, Daegu (KR); Jae Sung Heo, Uiwang-Si (KR); Jae Young Kim, Jeonju-Si (KR); Eul Ho Son, Yangsan-Si (KR)

(73) Assignees: Hyundai Motor Company, Seoul (KR); Kia Motors Corporation, Seoul (KR); DONG HEE INDUSTRIAL CO., LTD., Ulsan (KR)

( * ) Notice: Subject to any disclaimer, the term of this patent is extended or adjusted under 35 U.S.C. 154(b) by 0 days.

(21) Appl. No.: 16/583,044

(22) Filed: Sep. 25, 2019

(30) Foreign Application Priority Data

Apr. 15, 2019 (KR) .......................... 10-2019-0043722

(51) Int. Cl.
- *F16C 33/04* (2006.01)
- *F16C 17/02* (2006.01)
- *G05G 25/00* (2006.01)
- *G05G 1/44* (2008.04)

(52) U.S. Cl.
CPC ............. *F16C 17/02* (2013.01); *G05G 25/00* (2013.01); *F16C 2326/01* (2013.01); *G05G 1/44* (2013.01)

(58) Field of Classification Search
CPC ........ F16C 17/02; F16C 17/107; F16C 27/02; F16C 27/063; F16C 33/04; F16C 33/06; F16C 33/20; F16C 33/22; B60T 7/04; B60T 7/06; G05G 1/44; G05G 1/445
See application file for complete search history.

(56) References Cited

U.S. PATENT DOCUMENTS

| | | | | |
|---|---|---|---|---|
| 3,966,276 | A * | 6/1976 | Bellarbre | F16C 11/04 384/215 |
| 5,829,317 | A * | 11/1998 | Vreeken | G05G 1/30 74/560 |
| 10,133,294 | B2 * | 11/2018 | Kawahara | B60T 7/06 |
| 2017/0227047 | A1 * | 8/2017 | Fujiwara | F16C 33/04 |
| 2017/0262010 | A1 * | 9/2017 | Kumazawa | F16C 27/02 |

FOREIGN PATENT DOCUMENTS

KR 20-1999-0032348 U 7/1999

* cited by examiner

*Primary Examiner* — Phillip A Johnson
(74) *Attorney, Agent, or Firm* — Morgan, Lewis & Bockius LLP

(57) ABSTRACT

A hinge bush for a vehicle pedal apparatus may include a flange connected to a cylindrical portion may include an elastic section that elastically deforms when coming in contact with the internal side of a pedal member and an inelastic section that generates a strong supporting force, whereby it is possible to remove left and right spacing of the pedal arm through the elastic section and it is also possible to increase lateral rigidity of the pedal arm through the inelastic section.

12 Claims, 8 Drawing Sheets

FIG. 6

| ITEM | STRUCTURE A OF RELATED ART | STRUCTURE B OF RELATED ART | STRUCTURE OF INVENTION |
|---|---|---|---|
| SHAPE | | | |
| CROSS-SECTION | | | |
| SPACING & LATERAL RIGIDITY GRAPH | | | |

HINGE BUSH FOR VEHICLE PEDAL APPARATUS

CROSS-REFERENCE(S) TO RELATED APPLICATIONS

The present application claims priority to Korean Patent Application No. 10-2019-0043722, filed Apr. 15, 2019, the entire contents of which is incorporated herein for all purposes by this reference.

BACKGROUND OF THE INVENTION

Field of the Invention

The present invention relates to a hinge bush for a vehicle pedal apparatus and, more particularly, to a hinge bush for a vehicle pedal apparatus, the hinge bush being able to remove left-right spacing of a pedal arm and having a structure which is advantageous for lateral rigidity.

Description of Related Art

The current vehicles that a driver operates and drives in person have an accelerator pedal and a brake pedal, which are operated by a driver using feet, in the forward space under the driver's seat, and also include a clutch pedal if the vehicles are manual transmission vehicles.

Such pedal apparatuses are configured such that a pedal arm is rotated forwards and backwards when a driver operates the pedal arm with a foot, so a structure that can prevent left and right movement of the pedal arm and secure lateral rigidity to prevent noise and secure rigidity when load is input to the pedal arm is preferable.

However, a structure for preventing spacing to prevent left and right movement of a pedal arm and a structure for securing lateral rigidity are directly-opposed conceptual structures, and conventional hinge bushes cannot achieve both of the structure for preventing left and right spacing and the structure for securing lateral rigidity.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a hinge bush having a structure that can remove left and right movement of a pedal arm when external load is input, and is advantageous for lateral rigidity by removing spacing formed between the pedal arm and the pedal member so that noise due to a joint may be prevented and commercial value may be improved by improving satisfaction of customers.

According to various aspects of the present invention, a hinge bush for a vehicle pedal apparatus may include: a cylindrical portion configured to be mounted between a pipe portion of a pedal arm and a rotation shaft configured as a rotational center of the pedal arm, and extending in a longitudinal direction of the rotation shaft; and a flange extending radially outwardly from an end portion of the cylindrical portion and positioned between an end portion of the pipe portion and the pedal member, wherein the flange may include: an elastic section configured of removing spacing formed between the pedal arm and the pedal member by elastically deforming when coming in close contact with the pedal member; and an inelastic section configured of securing lateral rigidity by simultaneously coming in contact with an end portion of the pipe portion and the pedal member.

The flange may further include an interface section which is a section connecting the elastic section and the inelastic section and configured to prevent stress generated by deformation of the elastic section from being transmitted to the inelastic section.

The elastic section has a cross-sectional thickness smaller than a cross-sectional thickness of the inelastic section, and the interface section has a cross-sectional thickness smaller than a cross-sectional thickness of the elastic section.

The inelastic section of the flange is connected to an end portion of the cylindrical portion, and the interface section and the elastic section are sequentially connected to an end portion of the inelastic section.

A slit that is formed to cut the cylindrical portion in a longitudinal direction of the rotation shaft is formed at the cylindrical portion, and the cylindrical portion is configured to remove radial spacing of the pedal arm by being radially elastically deformed by the slit.

The cylindrical portion has a cross-section that can change in a longitudinal direction of the rotation shaft to be configured to remove radial spacing of the pedal arm.

According to the hinge bush for a vehicle pedal apparatus of the present invention, the flange of the hinge bush may include the elastic section that elastically deforms when coming in contact with the internal side of the pedal member and the inelastic section that generates a strong supporting force. Accordingly, it is possible to remove spacing because left and right movement of the pedal arm may be removed by the elastic section, so it is possible to improve satisfaction and commercial value and it is also possible to prevent noise due to a joint. Furthermore, since the inelastic section functions as a stopper with a strong supporting force, it is also possible to increase the lateral rigidity of the pedal arm.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a view for comparing a hinge bush having a structure of the related art and a hinge bush of the present invention;

Figure 1:
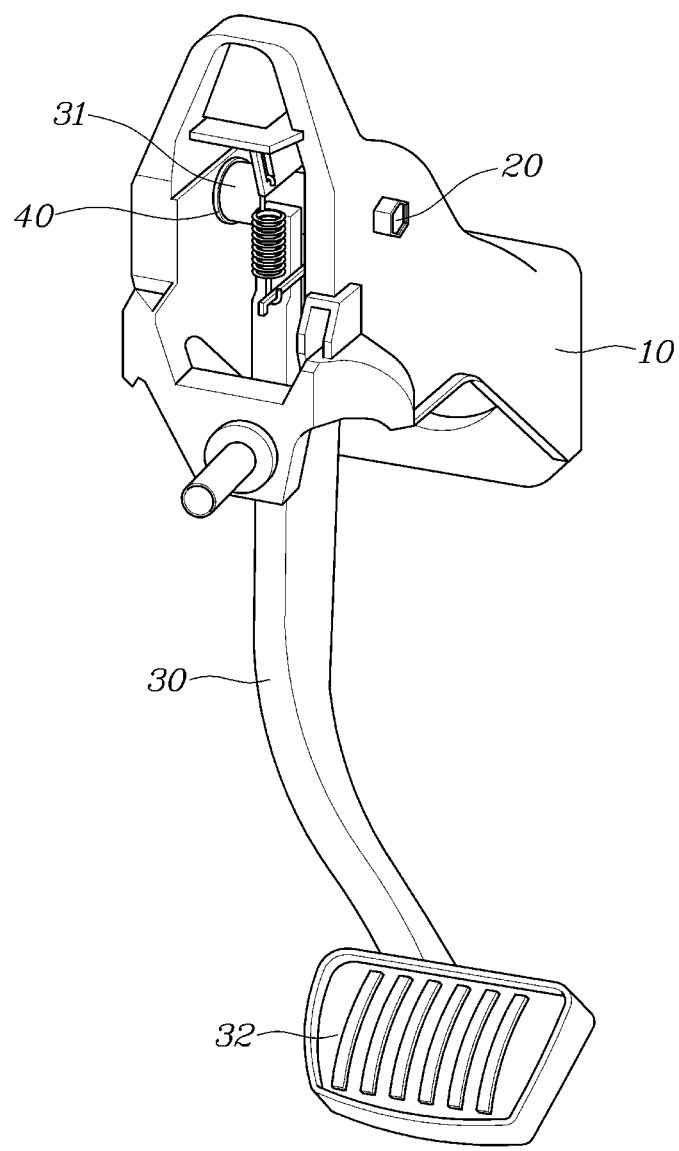
FIG. 1 is a perspective view of a pedal apparatus having a hinge bush according to an exemplary embodiment of the present invention.
Figure 2:
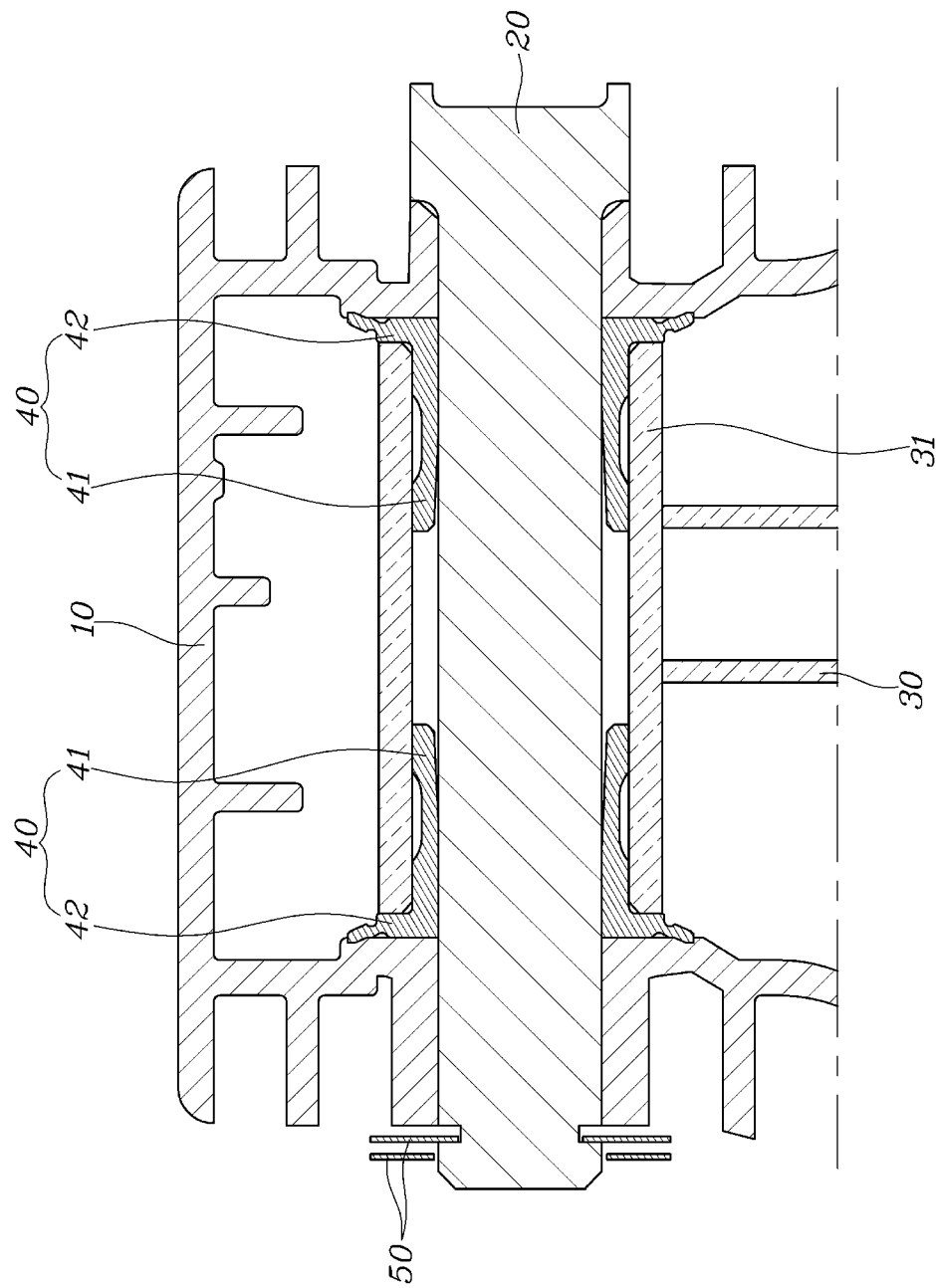
FIG. 2 is a cross-sectional view cut along a shaft of FIG. 1.
Figure 3:
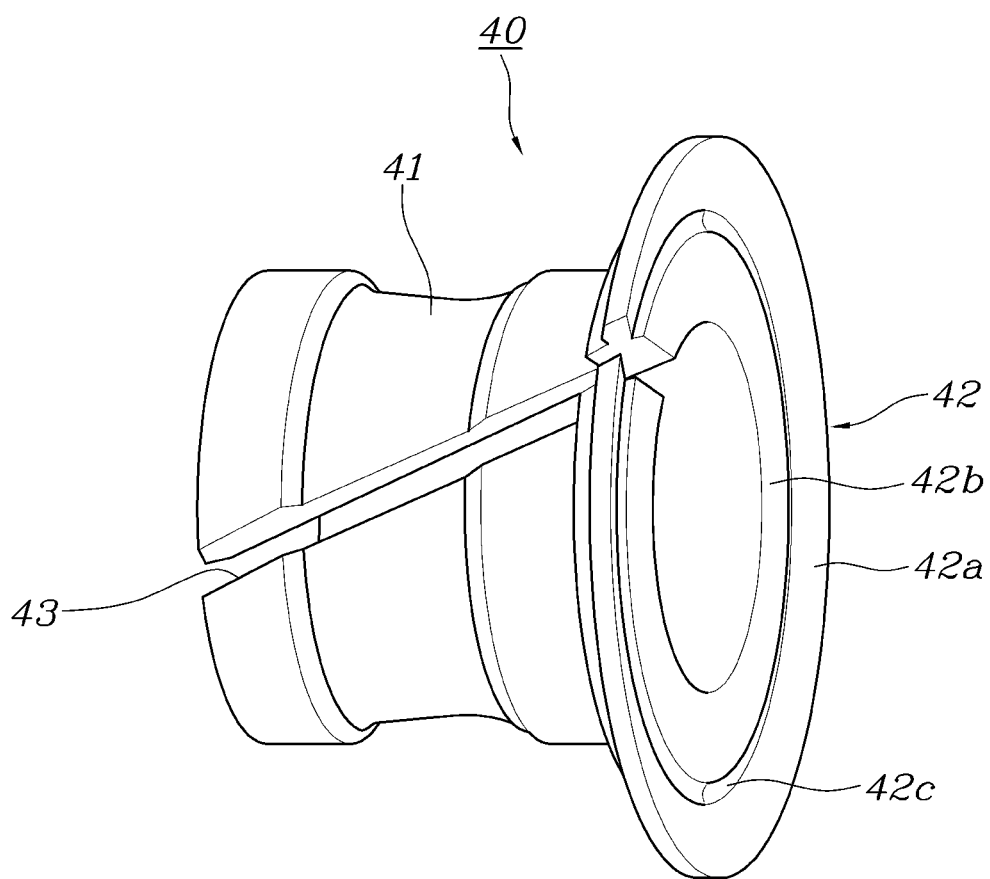
FIG. 3 is a perspective view of a hinge bush according to an exemplary embodiment of the present invention.
Figure 4:
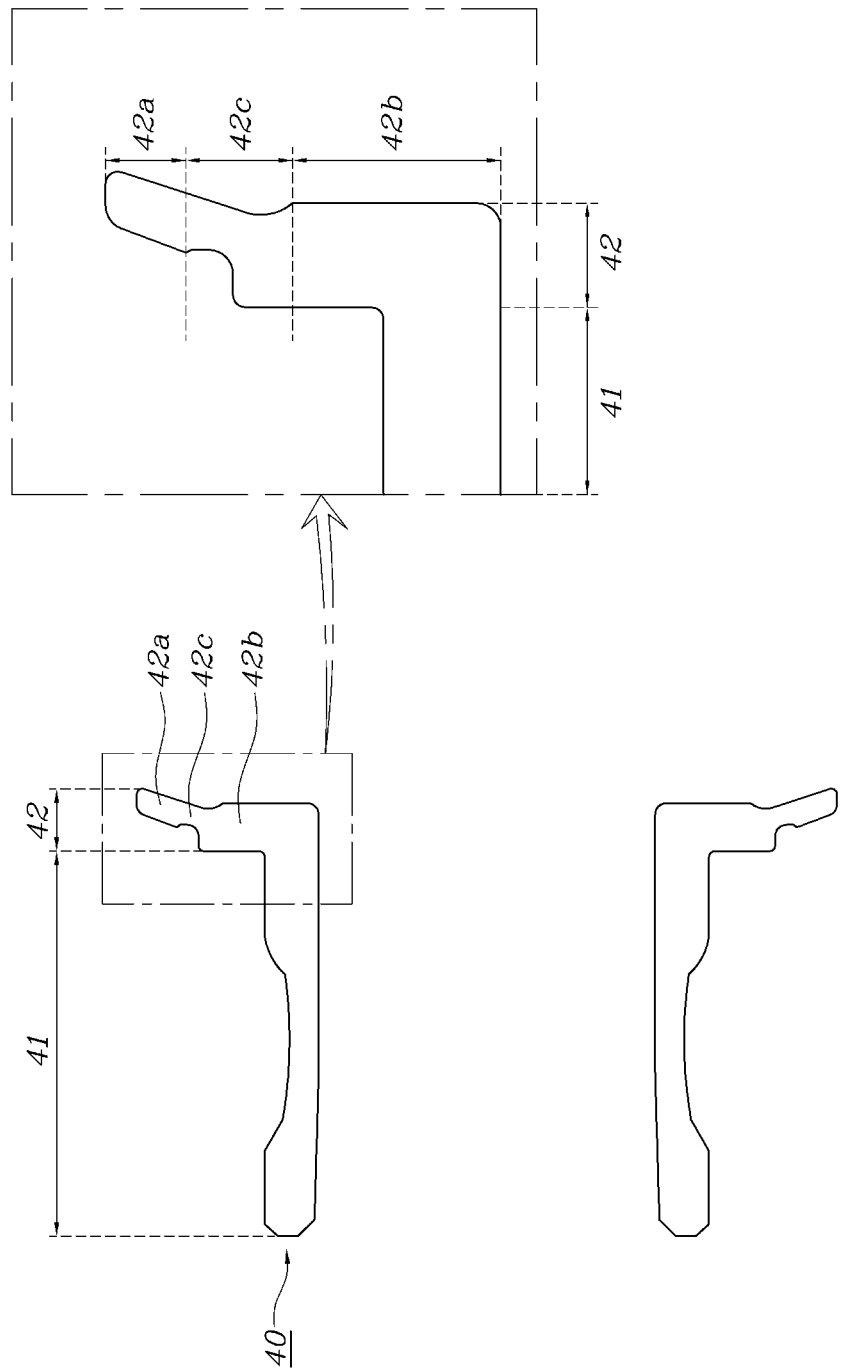
FIG. 4 is a cross-sectional view of FIG. 3.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A hinge bush for a vehicle pedal apparatus according exemplary embodiments of the present invention is described hereafter in detail with reference to the accompanying drawings.

A pedal apparatus of a vehicle includes: a pedal member 10 coupled to be fixed to a vehicle body panel (dash panel) mounted in front of and under a driver's seat; and a pedal arm 30 coupled to the pedal member 10 to be configured to rotate about a rotation shaft 20.

An end portion (upper end) of the pedal arm 30 is a cylindrical pipe portion 31 and a pad 32 that a driver operates with a foot is mounted at the other end portion (lower end) of the pedal arm 30.

The pipe portion 31 of the pedal arm 30 is mounted in the pedal member 10, a hinge bush 40 is inserted into the pipe portion 31 through both end portions of the pipe portion 31, the rotation shaft 20 is mounted through the pedal member 10, the hinge bush 40, and the pipe portion 31 of the pedal arm 30, and a clip 50 that prevents separation of the rotation shaft 20 is coupled to an end portion of the rotation shaft 20 protruding through the pedal member 10.

According to an exemplary embodiment of the present invention, two hinge bushes 40 are provided and are respectively inserted into the pipe portion 31 through both end portions of the pipe portion 31 of the pedal arm 30.

The hinge bush 40 has a cylindrical portion 41 and a flange 42.

The cylindrical portion 41 is mounted in the pipe portion 31 of the pedal arm 30 and extends in the longitudinal direction of the rotation shaft 20, and the rotation shaft 20 passes through the cylindrical portion 41. Furthermore, the external side of the cylindrical portion 41 is in close contact with the internal side of the pipe portion 31 of the pedal arm 30 and the internal side thereof is in close contact with the external side of the rotation shaft 20.

The flange 42 extends radially outwardly from an end portion of the cylindrical portion 41, is connected in a circular shape, and is positioned between an end portion of the pipe portion 31 of the pedal arm 30 and the internal side of the pedal member 10.

The flange 42 is formed in a shape having an elastic section 42a, an inelastic section 42b, and an interface section 42c.

The elastic section 42a, which is a section being in close contact with the internal side of the pedal member 10, elastically deforms to bend toward the cylindrical portion 31 when it is brought in close contact with the pedal member 10, and elastically return to come in close contact with the internal side of the pedal member 10, being able to remove left and right movement of the pedal arm 30.

That is, left and right spacing of the pedal arm 30 may be removed by the elastic section 42a, so it is possible to improve satisfaction and commercial value and it is also possible to prevent noise due to a joint.

The inelastic section 42b, which is a section being in close contact with both of an end portion of the pipe portion 31 of the pedal arm 30 and the internal side of the pedal member 10, has a uniform cross-sectional thickness without a change and is mounted to come in close contact with both of an end portion of the pipe portion 31 and the pedal member 10, being able to secure lateral rigidity through a strong supporting force.

When the elastic section 42an elastically deforms by coming in contact with the internal side of the pedal member 10, the inelastic section 42b functions as a stopper to prevent additional elastic deformation through a strong supporting force, so that the lateral rigidity of the pedal arm 30 may be increased.

According to an exemplary embodiment of the present invention, the elastic section 42a may have a cross-sectional thickness smaller than a cross-sectional thickness of the inelastic section 42b for smooth elastic deformation of the elastic section 42a.

The interface section 42c, which is a section connecting the elastic section 42a and the inelastic section 42b, prevents stress generated by deformation of the elastic section 42a from being transmitted to the inelastic section 42b.

To the present end, the interface section 42c may have a cross-sectional thickness smaller than a cross-sectional thickness of the elastic section 42a and the inelastic section 42b.

That is, the inelastic section 42b has a large cross-sectional thickness to secure lateral rigidity and the elastic section 42a has a cross-sectional thickness smaller than a cross-sectional thickness of the inelastic section 42b, preventing spacing through elastic deformation. Furthermore, the interface section 42c has the smallest cross-sectional thickness, preventing stress generated by deformation of the elastic section 42a from being transmitted to the inelastic section 42b.

In the hinge bush 40 according to an exemplary embodiment of the present invention, the inelastic section 42b of the flange 42 is connected to an end portion of the cylindrical portion 41, the interface section 42c is connected to an end portion of the inelastic section 42b, and the elastic section 42a is connected to an end portion of the interface section 42c.

In an exemplary embodiment of the present invention, the interface section 42c includes a groove formed in an annular shape between the inelastic section 42b and the elastic section 42a.

The hinge bush 40 according to an exemplary embodiment of the present invention further has a slit 43 cut in the cylindrical portion 41 in the longitudinal direction of the rotation shaft 20 to cut the cylindrical portion 41, so that the cylindrical portion 41 can remove radial spacing of the pedal arm 30 by elastically radially deforming by the slit 43 when load is input to the pedal arm 30.

In an exemplary embodiment of the present invention, the slit 43 cut in the cylindrical portion 41 with an acute angle with respect to the longitudinal axis of the rotation shaft 20 in the longitudinal direction of the rotation shaft 20.

The cross-section of the cylindrical portion 41 of the hinge bush 40 according to an exemplary embodiment of the present invention can change in the longitudinal direction of the rotation shaft 20, being able to induce radial elastic deformation of the cylindrical portion 41 when load is input to the pedal arm 30. Accordingly, it helps remove radial spacing of the pedal arm 30.

Figure 5:
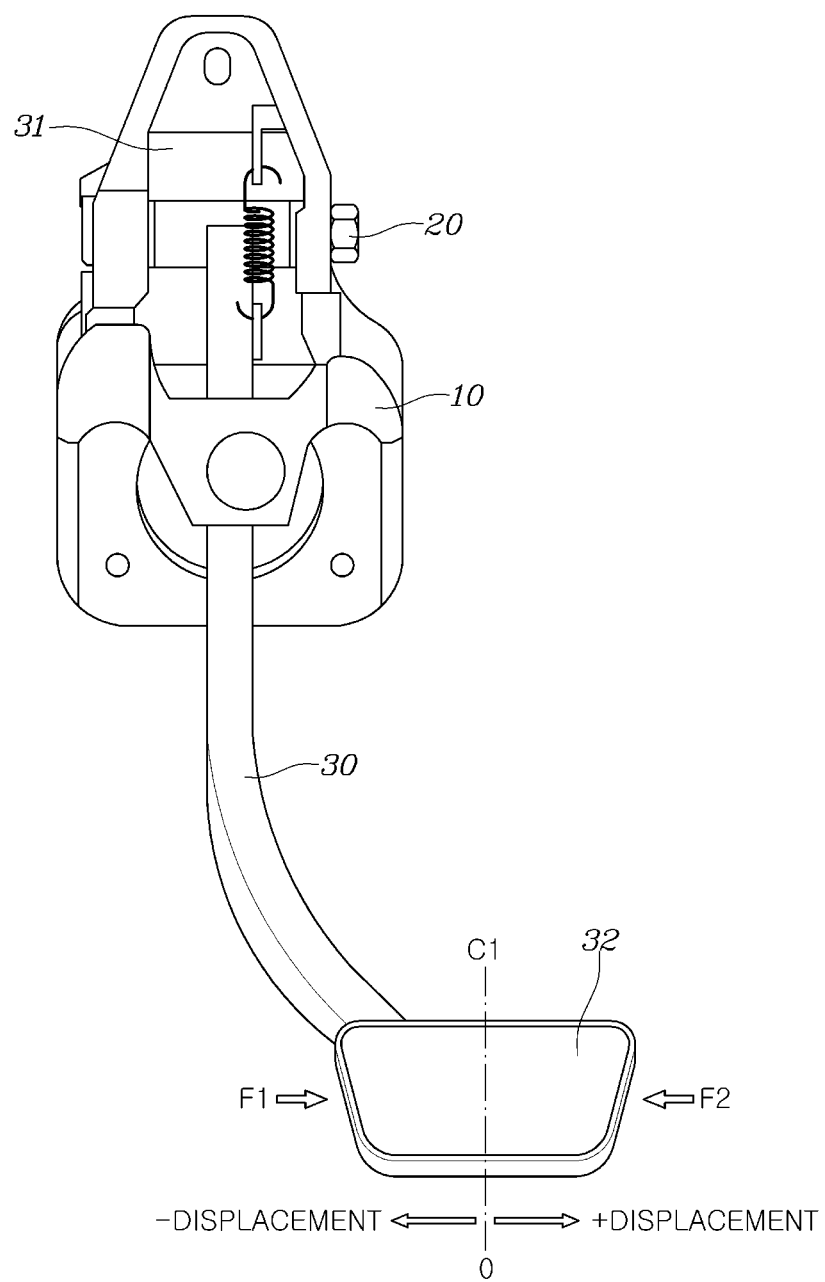
FIG. 5 is a front view of a pedal apparatus when external load is not input to a pedal arm.

FIG. 5 is a front view of the pedal apparatus, in which external load has not been input to the pedal arm 30, and with the center portion of the pad 32 positioned on the center line C1, when external load F1 is input, the pedal arm 30 moves to + (plus) displacement, and when external force F2 is input, the pedal arm 30 moves to − (minus) displacement.

FIG. 6 is a view for comparing a hinge bush having a structure of the related art and a hinge bush of the present invention.

An A-type hinge bush 100 having a structure of the related art is advantageous in terms of lateral rigidity by a strong supporting force because a flange 110 is in close contact with the internal side of a pedal member 10 without elastically deforming, but is disadvantageous in terms of spacing because the flange 110 does not elastically deform and a pedal arm 30 cannot absorb left and right spacing.

Referring to the spacing and lateral rigidity graph, it may be seen that the A-type hinge bush 100 has a structure which is disadvantageous in terms of spacing because there is a spacing section where the pedal arm 30 moves to the + displacement and the − displacement from the center line C1 when external loads F1 and F2 are applied to the pedal arm 30. Furthermore, it may be seen that the structure is advantageous in terms of lateral rigidity because the supporting force rapidly increases beyond the spacing section.

However, the hinge bush 40 according to an exemplary embodiment of the present invention, as described above, can remove left and right spacing of the pedal arm 30 through the elastic section 42a of the flange 42 and increase the lateral rigidity of the pedal arm 30 through the inelastic section 42b. Accordingly, the spacing and lateral rigidity graph describes a parabola that gradually goes upwards to the + displacement and the − displacement from the center line C1.

Figure 7:
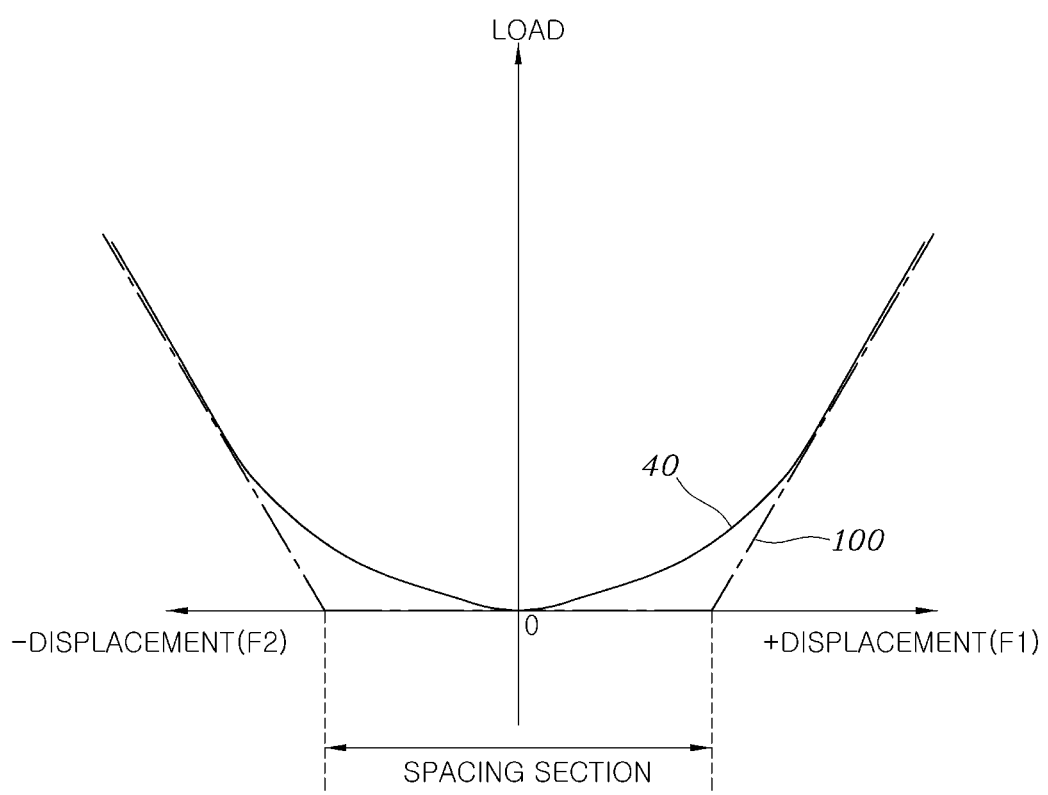
FIG. 7 is a view comparing spacing and lateral rigidity in an A-type hinge bush having a structure of the related art and the hinge bush of the present invention through a graph.

Comparing the hinge bush 40 according to an exemplary embodiment of the present invention and the A-type hinge bush 100 of the related art through a graph, as shown in FIG. 7, it may be seen that the hinge bush 40 according to an exemplary embodiment of the present invention is advantageous in terms of spacing in comparison to the A-type hinge bush 100 of the related art because left and right spacing does not occur when external loads F1 and F2 are input. Furthermore, it may be seen that the structure of the hinge bush 40 is advantageous also in terms of lateral rigidity because it shows ability equal to the A-type hinge bush 100 of the related art.

Furthermore, a B-type hinge bush 200 having a structure of the related art has an elastic structure in which a cylindrical portion 210 and a flange 220 are connected through a groove 230 and the entire flange 220 bends with respect to the cylindrical portion 210 from the groove 230. According to the present structure, the entire flange 220 elastically deforms when the flange 220 comes in contact with a pedal member 10, so it is advantageous in terms of absorbing left and right spacing of the pedal arm 30, but is disadvantageous in terms of lateral rigidity because the entire flange 220 bends with elastic deformation.

Referring to a spacing and lateral rigidity graph, the B-type hinge bush 200 may be expressed as a parabolic graph that gradually goes upwards to the + displacement and the − displacement from the center line C1 when external loads F1 and F2 are applied to the pedal arm 30.

Figure 8:
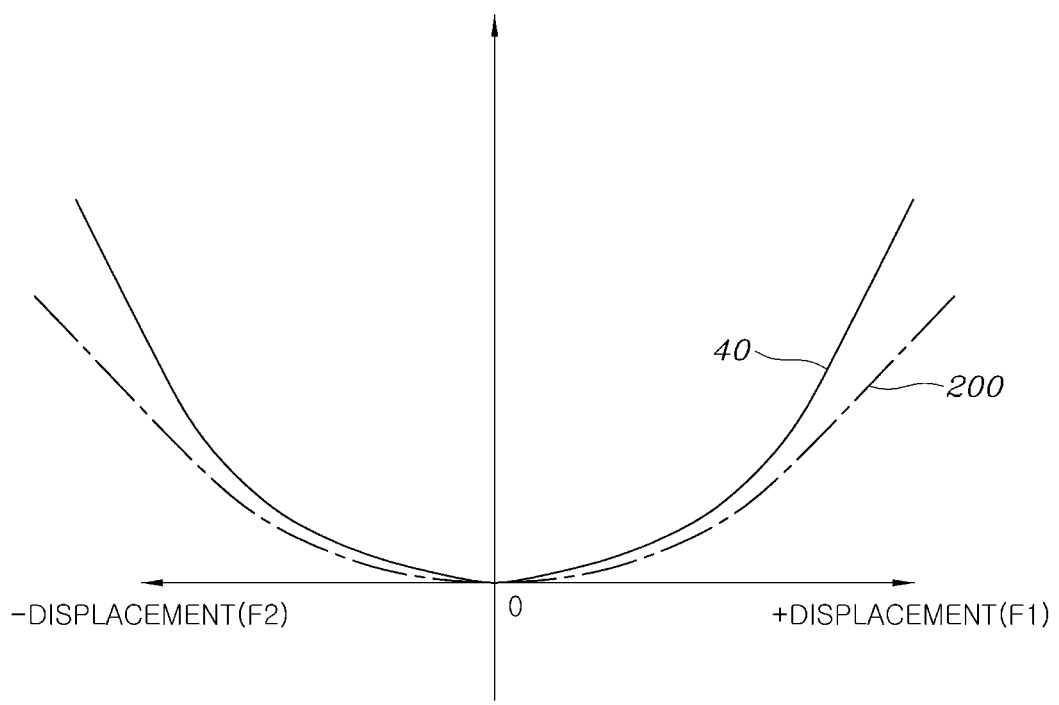
FIG. 8 is a view comparing spacing and lateral rigidity in a B-type hinge bush having a structure of the related art and the hinge bush of the present invention through a graph.

However, comparing the hinge bush 40 according to an exemplary embodiment of the present invention and the B-type hinge bush 200 of the related art through a graph, as shown in FIG. 8, both of the hinge bush 40 according to an exemplary embodiment of the present invention and the B-type hinge bush 200 of the related art are expressed by parabolic graphs, but the hinge bush 40 according to an exemplary embodiment of the present invention generates a strong supporting force through the inelastic section 42b. Accordingly, it may be seen that the structure of the hinge bush 40 is advantageous in terms of lateral rigidity and shows a similar ability in terms of preventing spacing, as compared with the B-type hinge bush 200 of the related art.

As described above, in an exemplary embodiment of the present invention, the flange 42 of the hinge bush 40 has the elastic section 42a that elastically deforms when coming in contact with the internal side of the pedal member 10 and the inelastic section 42b that generates a strong supporting force. Accordingly, it is possible to remove spacing because left and right movement of the pedal arm 30 may be removed by the elastic section 42a, so it is possible to improve sensitive quality and commercial value and it is also possible to prevent noise due to a joint. Furthermore, since the inelastic section 42b functions as a stopper with a strong supporting force, it is also possible to increase the lateral rigidity of the pedal arm 30.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hinge bush for a vehicle pedal apparatus, the hinge bush comprising:
   a cylindrical portion configured to be mounted between a cylindrical pipe portion of a pedal arm and a rotation shaft configured as a rotational center of the pedal arm, and to extend in a longitudinal direction of the rotation shaft; and a flange extending radially outwardly from an end portion of the cylindrical portion and configured to be disposed between an end portion of the cylindrical pipe portion and a pedal member, wherein the flange includes:
an elastic section configured of removing spacing formed between the pedal arm and the pedal member by elastically deforming when coming in contact with the pedal member; and
an inelastic section coming in contact with the cylindrical pipe portion and the pedal member.

2. The hinge bush of claim 1,
wherein the flange further includes an interface section which is a section connecting the elastic section and the inelastic section and configured to prevent stress generated by deformation of the elastic section from being transmitted to the inelastic section.

3. The hinge bush of claim 2,
wherein the elastic section has a cross-sectional thickness smaller than a cross-sectional thickness of the inelastic section, and
wherein the interface section has a cross-sectional thickness smaller than the cross-sectional thickness of the elastic section.

4. The hinge bush of claim 2,
wherein the inelastic section of the flange is connected to an end portion of the cylindrical portion, and
wherein the interface section and the elastic section are sequentially connected to an end portion of the inelastic section.

5. The hinge bush of claim 1, further including a slit formed to cut a portion of the cylindrical portion in a longitudinal direction of the cylindrical portion.

6. The hinge bush of claim 5, wherein the slit is formed to cut a portion of the flange.

7. The hinge bush of claim 5,
wherein the cylindrical portion is configured to remove radial spacing formed between the cylindrical pipe portion of the pedal arm and the rotation shaft by being elastically deformed between the cylindrical pipe portion of the pedal arm and the rotation shaft by the slit in a radial direction of the cylindrical portion.

8. The hinge bush of claim 5, wherein the slit is formed to cut the cylindrical portion with an acute angle with respect to a longitudinal axis of the cylindrical portion.

9. The hinge bush of claim 1,
wherein the cylindrical portion has a cross-section that is configured to change in a longitudinal direction of the rotation shaft to remove radial spacing formed between the cylindrical pipe portion of the pedal arm and the rotation shaft.

10. The hinge bush of claim 9, wherein the flange further includes an interface section connecting the first section and the second section and includes a groove formed in an annular shape between the first section and the second section.

11. A hinge bush for a vehicle pedal apparatus, the hinge bush comprising:
a cylindrical portion configured to be mounted between a cylindrical pipe portion of a pedal arm and a rotation shaft configured as a rotational center of the pedal arm, and to extend in a longitudinal direction of the rotation shaft; and
a flange extending radially outwardly from an end portion of the cylindrical portion and configured to be disposed between the cylindrical pipe portion and the pedal member, wherein the flange includes:
a first section configured of removing spacing formed between the pedal arm and the pedal member by elastically deforming when coming in contact with the pedal member; and
a second section configured to come in contact with the cylindrical pipe portion, the pedal member, and the rotation shaft.

12. The hinge bush of claim 11,
wherein the first section has an elasticity higher than an elasticity of the second section.

* * * * *